United States Patent Office 2,739,170
Patented Mar. 20, 1956

2,739,170

PREPARATION OF ALKYLIDENE-BIS-HALOALKANOIC AMIDES

Erwin Heisenberg, Erlenbach (Main), Johannes Kleine, Munich, and Rudolf Lotz, Klingenberg (Main), Germany, assignors to Vereinigte Glanzstoff-Fabriken Aktiengesellschaft, Wuppertal-Elberfeld, Germany, a joint-stock company No Drawing. Application October 7, 1954, Serial No. 461,014

Claims priority, application Germany January 18, 1951

6 Claims. (Cl. 260—561)

This invention relates to alkylene- and alkylidene-bis-amides, and to a new process for their preparation. More specifically, the invention relates to alkylene- and alkylidene-bis-amides corresponding to the general formula:

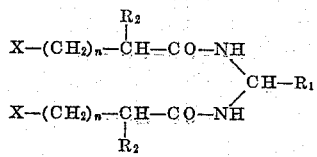

where $R_1$ is hydrogen or alkyl, $R_2$ is hydrogen, alkyl, or halogen, X is halogen and $n$ is 1 or 2.

We have found according to the present invention, that compounds corresponding to the above general formula may be prepared more easily and rapidly, with improved yield and purity, when the materials used for their synthesis are reacted in the gaseous or vapor phase.

The methods of the prior art were confined to conducting the reaction for the preparation of bis-amides in the liquid phase. The discovery of the feasibility and advantages of conducting the reaction in the vapor phase comprises a most important aspect of the present invention. It could not be predicted from known methods of synthesis that vapor phase operation according to our invention would result in direct production of these substances. Among the advantages of the vapor phase process are an almost instantaneous conversion with the elimination of prolonged heating to bring about the reaction, and the obtaining of the compounds in a technically pure state immediately upon passing the reaction mixture through the reaction zone followed by cooling. In industrial operations this is significant in eliminating additional washing and purification steps. The most decisive advantage of the vapor phase method of our invention lies in the fact that it may be run as a continuous process without the necessity of cumbersome separate heating of individual liquid charges, the products being obtained in practically pure (and usually crystalline) form simply by cooling.

The alkylene- and alkylidene-bis amides are prepared in accordance with the present invention by reacting, in the vapor phase, an aliphatic aldehyde, a nitrile of an unsaturated acyclic acid (a cyanoalkene), a hydrogen halide, and water. Based upon stoichiometric considerations, the reaction would require approximately 1 mol each of aldehyde and water, and 2 mols each of nitrile and at least 2 mols of the hydrogen halide, but in actual practice, these molar proportions may be subject to wide variations, depending upon considerations of type of compound being prepared, time and yield.

The aliphatic aldehyde has the general formula $R_1CHO$, where $R_1$ is hydrogen or an alkyl group. Formaldehyde may be used where alkylene-bis-amides are to be prepared. In place of formaldehyde itself, compounds may be used which are capable of generating formaldehyde by decomposition. For example, paraformaldehyde upon heating decomposes to form formaldehyde. Monochloracetic acid at temperatures of about 400° C. decomposes to form formaldehyde, hydrogen chloride, and carbon monoxide. Acetaldehyde, propionaldehyde, and other aliphatic aldehydes yield alkylidene-bis-amides.

The nitriles of unsaturated acyclic acids (cyano-alkenes) which may be used in the reaction are those having the general formula $$R_3\text{—CN}$$

where $R_3$ is an alkenyl group having a double bond in the $\alpha$ or $\beta$ position which may also contain alpha- and beta-substituted halogen, alkyl, and aralkyl groups. For example, we may employ as reactants alpha-chloracrylonitrile, alpha-methacrylic acid nitrile. In addition, we may use cyano-alkenes which are homologs of acrylonitrile, for example, crotonic acid nitrile, allyl cyanide, and their halogen or alkyl substituted derivatives.

Examples of hydrogen halides include hydrogen chloride and hydrogen bromide.

It has been found necessary that at least a certain amount of water be present for the reaction to take place, the water being in the form of water vapor at the temperature of the reaction. Most conveniently the water is brought into the reaction mixture by the use of an aqueous solution of formaldehyde or hydrochloric acid or both. The amount of water necessary for the reaction to take place varies within wide limits, generally upward from one mol. However, it has been found convenient to utilize an amount of water which is equivalent to from 2 to 3 times by weight of the amount of formaldehyde in the reaction mixture. It will be understood, however, that this is a preferred amount, and that practically any amount of water may be used.

Although the reaction according to the present invention can take place without the use of a catalyst, the yields in such cases are quite low. The use of a catalyst greatly increases the yield. In general, the useful catalysts are those of the surface-active type, or mixtures of such catalysts. Surface-active catalysts include, for example, aluminum chloride, aluminum oxide, boron phosphate, silica gel, zinc oxide, and clay shard, and mixtures thereof. Thus, a mixture of parts by weight of boron phosphate and twenty (20) parts of aluminum oxide has been found to be particularly suitable for this purpose.

We have also found that the vapor phase reaction may be advantageously carried out in an atmosphere of an inert gas, meaning thereby a gas which will not react with the gaseous reactants or the resulting bis-amide. Examples of inert gases include nitrogen, the rare gases, and carbon monoxide. The nitrogen or rare gases may be introduced together with the hydrogen halide. On the other hand, if monochloracetic acid which decomposes to form formaldehyde, hydrogen chloride, and carbon monoxide, is used to generate formaldehyde in the reaction vessel, the carbon monoxide liberated serves as the inert gas for this purpose.

The time of heating of the reaction mixture varies from 1 to 10 hours, depending upon the reaction temperature and the proportion of the reactants. The time is preferably regulated so that it is between 3 and 9 hours, and most preferably from 3 to 5 hours.

In carrying out our vapor phase method, heat is applied to the various reactants in order to bring them to the gaseous or vapor state, and thence to the desired reaction temperature. Thus, for example, the reactants may be introduced into a reaction tube or vessel, which may, for example, be electrically heated. If they are introduced in liquid form, vaporization occurs in the reaction vessel. On the other hand, the reactants may first be vaporized elsewhere, and the vapors let into the reaction vessel for further heating to the reaction temperature. Thus, a derivative of acrylonitrile and an aqueous solution of formaldehyde may be heated in an oven to gasify the substances, and to form water vapor. A gaseous mixture of hydrogen chloride and nitrogen is then introduced, the nitrogen forming an inert atmosphere in which the reaction of the nitrile, formaldehyde, hydrogen chloride and water takes place.

The reaction is carried out at a temperature at least sufficient to insure that all the reactants are in the vapor phase. Depending upon the nitriles and aldehydes selected, the range of reaction temperature may lie between 80° and 500° C. Most of the bis-amides are advantageously prepared within a range of 200° to 400° C., but we have found that, in general, the best results are obtained at temperatures between 350° and 380° C.

The compounds prepared by this new method are bis-amides having two terminal halogen atoms. By treatment with ammonia, they can be converted to the corresponding mono- or diamines, with replacement of one or both halogens. They may be further treated to effect self-polymerization to furnish valuable resinous materials which may be employed in the various arts in which such materials find application, for instance, in the preparation of molding powders, films, and as a coating material for paper, wood, metal, and cloth.

The following specific examples serve to illustrate but are not intended to limit the present invention:

EXAMPLE I

*Preparation of methylene-bis-β-chlorpropionic acid amide*

110 g. of acrylic acid nitrile and 110 g. of formaldehyde (35% solution) are introduced dropwise into an electric oven 1.2 meters in length, and simultaneously gaseous hydrogen chloride and nitrogen in the ratio of 1:1 are introduced into the oven at a rate of flow of 20 liters per hour. The oven is heated at a temperature of 350–400° C. for 3–5 hours. A mixture of 25 parts by weight of $Al_2O_3$ and 25 parts of $BPO_4$, in an amount up to 50 g. serves as catalyst. The catalyst is preferably distributed on a sieve located in the oven. After 5 hours a yellowish-white, semi-solid methylene-bis-β-chlorpropionic acid amide is collected, which has a melting point of 198° C., and is soluble in methanol and ethanol. The yield is about 200 g.

EXAMPLE II

*Alternative preparation of methylene-bis-β-chlorpropionic acid amide*

This example is carried out exactly as Example I, but using 90 g. paraformaldehyde as a source of formaldehyde. A small amount of water, about 10 g. influences the reaction favorably; $AlCl_3$ is used as the catalyst in the amount of 80 g. The resulting compound is the same as that obtained in Example I, also having a melting point of 198° C. The yield is 195 g.

The process may also be carried out using as a catalyst 50 g. of clay shard, and 250 g. monochloracetic acid as the source of formaldehyde and hydrogen chloride. The $CO_2$ generated by decomposition of the acid at 400° C. serves as an inert gas.

The methylene-bis-β-chlorpropionic acid amide produced according to the process of the present invention has a melting point of 198° C., a density $D_4^{20}$ of 1.2903, and crystallizes as prismatic colorless needles. It is soluble in such solvents as methanol and ethanol, and slightly soluble in chloroform, benzol and carbon tetrachloride. The product is therefore preferably crystallized from methanol ethanol solutions. At first, the product emerging from the reaction vessel is clear, viscous and oily. Upon cooling it starts to solidify, and upon further cooling becomes a yellowish-white semi-solid. The latter is recrystallized from hot methanol or ethanol.

In view of the known difficulty of controlling chemical reactions in the vapor phase because of the danger of decomposition, the discovery of the present invention that a reaction mixture of acrylonitrile, formaldehyde and hydrogen chloride could be reacted at temperatures up to 500° C. and at normal pressure without decomposition, and with the formation of this compound, was wholly unexpected.

EXAMPLE III

*Preparation of methylene-bis-α.β-dichlorpropionic acid amide*

87 g. of α-chloracrylonitrile and 200 g. of 35% aqueous formaldehyde solution are added dropwise into an electrically heated tube over a period of about 5 hours. The tube is heated to a temperature of about 350° C. and contains in the inner portions and finely distributed throughout a mixture of 75 parts by weight of boron phosphate and 75 parts of aluminum oxide as a catalyst. Simultaneously a mixture of one part of hydrogen chloride and one part of oxygen-free nitrogen is made to flow into the interior of the heated tube at a rate of about 25 liters per hour. The reaction product is methylene-bis-α.β-dichlorpropionic acid amide, which is drawn off and freed from small amounts of unreacted starting materials. The crude product is crystallized from methanol. The yield is 120 g.

EXAMPLE IV

*Preparation of methylene-bis-gamma-chlorobutyric acid amide*

65 g. of allyl cyanide and 250 g. of 35% aqueous formaldehyde solution are added dropwise into an electrically heated tube. The tube is heated to a temperature of 350–380° C. and contains as a catalyst a mixture of 50 parts by weight of boron phosphate and 50 parts of silica gel. Simultaneously a stream of one part of hydrogen chloride and one part of nitrogen is made to flow into the heated tube at a rate of 35 liters per hour. After cooling, a large portion of the formed product is collected. After crystallization from alcohol, the resulting product forms colorless crystals and has a melting point of 174.5° C. The yield is about 100 g.

EXAMPLE V

*Preparation of ethylidene-bis-α.b-dichlorpropionic acid amide*

90 g. of chloracrylic acid nitrile and 85 g. acetaldehyde with a water content of about 5% are added dropwise over a period of 3 hours into an electrically heated tube, the inner part of which is heated to a temperature of 350–380° C., and contains a mixture of 30 parts by weight of boron phosphate and 30 parts silica gel as a catalyst. Simultaneously a stream of one part hydrogen chloride and one part oxygen-free nitrogen gas is passed into the tube at a rate of about 20 liters per hour. The resulting product is ethylidene-bis-α.β-dichlorpropionic acid amide, having a melting point of 180° C. The yield is 110 g.

This application is a continuation-in-part of our patent applications Serial No. 266,608, filed January 15, 1952, and Serial No. 287,602, filed May 13, 1952, both of which are now abandoned.

We claim:

1. The method of preparing alkylidene-bis-haloalkyl amides which comprises vaporizing an unsaturated nitrile of the class consisting of lower alkenyl and chloro-lower alkenyl nitriles, contacting said nitrile while in the vapor phase with the vapor of a lower alkanal, vapor of the group consisting of hydrogen chloride and hydrogen bromide, and water vapor, at a temperature from about 80° C. to 500° C., in the presence of a catalyst selected from the class consisting of aluminum chloride, aluminum oxide, boron phosphate, zinc oxide, clay shard, silica gel, and mixtures thereof, the molar amount of alkanal ranging from about 0.5 to 3 times the molar amount of nitrile, the molar proportion of hydrogen halide being at least 1 mol relative to each mol of the nitrile, the quantity of water being from two to three times the quantity of alkanal, and collecting the bis-amide.

2. The method of claim 1, wherein the alkanal is formaldehyde.

3. The method of claim 1, wherein the alkanal is acetaldehyde.

4. The method of claim 1, wherein the nitrile is acrylonitrile.

5. The method of claim 1, wherein the nitrile is α-chloracrylonitrile.

6. The method of claim 1, wherein the nitrile is allyl cyanide.

References Cited in the file of this patent

UNITED STATES PATENTS

| | | |
|---|---|---|
| 2,270,520 | Graenacher et al. | Jan. 20, 1942 |
| 2,338,177 | Graenacher et al. | Jan. 4, 1944 |
| 2,475,846 | Lundberg | July 12, 1949 |
| 2,534,204 | Mowry | Dec. 12, 1950 |
| 2,576,501 | Dalton | Nov. 27, 1951 |
| 2,576,502 | Dalton | Nov. 27, 1951 |

FOREIGN PATENTS

| | | |
|---|---|---|
| 882,106 | France | Feb. 15, 1943 |

OTHER REFERENCES

Einhorn: "Liebigs Annalen" vol. 343 (1905) p. 284.

Hepp et al.: Ber. Deut. Chem., vol. 9 (1876), pp. 1424–28.

Hepp: Ber. Deut. Chem., vol. 10 (1877), pp. 1649–52.

Thiesing: J. Prak. Chem., vol. 44, Series 2 (1891), pp. 570–71.

Mowry et al.: JACS, vol. 72 (October 1950), pp. 4439–41.

Batt et al.: J. Chem. Soc. (London), 1948, p. 2322.

Magat et al.: JACS, vol. 73, March 1951, pp. 1028–35.

Jacobs et al.: J. Biol. Chem., vol. 21 (1915), pp. 145–52.